(12) United States Patent
Pentkovski et al.

(10) Patent No.: US 6,976,131 B2
(45) Date of Patent: Dec. 13, 2005

(54) METHOD AND APPARATUS FOR SHARED CACHE COHERENCY FOR A CHIP MULTIPROCESSOR OR MULTIPROCESSOR SYSTEM

(75) Inventors: Vladimir Pentkovski, Folsom, CA (US); Vivek Garg, Folsom, CA (US); Narayanan S. Iyer, Folsom, CA (US); Jagannath Keshava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 10/226,478

(22) Filed: Aug. 23, 2002

(65) Prior Publication Data

US 2004/0039880 A1 Feb. 26, 2004

(51) Int. Cl.[7] ............................................... G06F 12/00
(52) U.S. Cl. ...................... 711/146; 711/141; 711/130; 711/156
(58) Field of Search ................................. 711/119, 121, 711/122, 130, 146, 141, 147, 118, 120, 156

(56) References Cited

U.S. PATENT DOCUMENTS

| | | | |
|---|---|---|---|
| 6,434,672 B1 * | 8/2002 | Gaither ........................ | 711/130 |
| 6,651,145 B1 * | 11/2003 | Jamil et al. .................. | 711/144 |
| 6,728,842 B2 * | 4/2004 | Brown et al. ................ | 711/146 |
| 2002/0053004 A1 * | 5/2002 | Pong .......................... | 711/119 |
| 2003/0097531 A1 * | 5/2003 | Arimilli et al. .............. | 711/146 |

OTHER PUBLICATIONS

Johnson, David J.C., "HP's Mako Processor," Fort Collins Microprocessor Lab, Hewlett–Packard Co., Oct. 16, 2001, 16 pages.

Tendler, Joel., et al., "IBM@ server POWER4 System Microarchitecture," Technical White Paper, IBM Server Group, Oct. 2001, 33 pages.

* cited by examiner

*Primary Examiner*—Mano Padmanabhan
*Assistant Examiner*—Jasmine Song
(74) *Attorney, Agent, or Firm*—Jeffrey S. Draeger

(57) ABSTRACT

A method and apparatus for shared cache coherency for a chip multiprocessor or a multiprocessor system. In one embodiment, a multicore processor includes a plurality of processor cores, each having a private cache, and a shared cache. An internal snoop bus is coupled to each private cache and the shared cache to communicate data from each private cache to other private caches and the shared cache. In another embodiment, an apparatus includes a plurality of processor cores and a plurality of caches. One of the plurality of caches maintains cache lines in two different modified states. The first modified state indicates a most recent copy of a modified cache line, and the second modified state indicates a stale copy of the modified cache line.

25 Claims, 10 Drawing Sheets

METHOD AND APPARATUS FOR SHARED CACHE COHERENCY FOR A CHIP MULTIPROCESSOR OR MULTIPROCESSOR SYSTEM

BACKGROUND

1. Field

The present disclosure pertains to the field of processing systems and their associated caching arrangements.

2. Description of Related Art

Improving the performance of computer or other processing systems generally improves overall throughput and/or provides a better user experience. One technique of improving the overall quantity of instructions processed in a system is to increase the number of processors in the system. Implementing multiprocessing (MP) systems, however, typically requires more than merely interconnecting processors in parallel. For example, tasks or programs may need to be divided so they can execute across parallel processing resources, memory consistency systems may be needed, etc.

As logic elements continue to shrink due to advances in fabrication technology, integrating multiple processors into a single component becomes more practical, and in fact a number of current designs implement multiple processors on a single component (a "multicore processor"). Multicore processors also typically integrate some additional cache memory in addition to any caches closely associated with each processor core, and varying techniques are used to maintain coherency across the hierarchy within the multicore processor device.

For example, in one prior art processor, a level one (L1) cache associated with each processor core is implemented as a write through cache, such that a shared level two (L2) cache receives all modifications by each L1. Writes from each L1 are posted to queues for the L2 cache. When a fabric operation hits a valid L2 directory entry, a snoop processor is assigned to respond to the snoop using only the L2 contents (including potentially any queued entries). While using a write-through protocol is known to be inferior in performance under some circumstances compared to using a writeback protocol and/or the well known four state MESI (Modified, Exclusive, Shared, Invalid) protocol, the use of write-through eliminates the need for cross-interrogation of the L1 caches in this prior art multicore processor. Without cross-interrogation between L1 caches, no snoop bus is provided between L1 caches, and no L1-to-L1 transfers may occur.

This prior art processor also implements a modified MESI protocol for its L2 cache, having three "modified" states, as well as two "shared" states, and a new "tagged" state. The modified states M, Me, and Mu correspond to a modified state, a modified exclusive state, and a modified unsolicited state. The modified exclusive and modified unsolicited states both indicate that the data is valid. Additionally, both the modified exclusive and modified unsolicited states result from a processor asking for a reservation of data via a specialized instruction.

In another prior art multicore processor, two L1 caches are also separated by the L2 cache. In this prior art processor, the core logic is linked directly to the L2 cache control logic and to the private L1. Thus, coherency lookups in the L1 and L2 may begin simultaneously; however, the L2 control logic separates the L1 associated with the first core from the L1 associated with the second core. Therefore, again the L1 caches private to and associated with each processor are not linked to each other. Accordingly, there is no direct cross-interrogation between L1 caches and no direct L1-to-L1 data passing.

BRIEF DESCRIPTION OF THE FIGURES

The present invention is illustrated by way of example and not limited by the implementation in the Figures of the accompanying drawings.

DETAILED DESCRIPTION

The following description describes embodiments of a method and apparatus for shared cache coherency for a chip multiprocessor or multiprocessor system. In the following description, numerous specific details are set forth in order to provide a more thorough understanding of the present invention. It will be appreciated, however, by one skilled in the art that the invention may be practiced without such specific details.

Some embodiments disclosed use a dedicated and in some cases internal snoop interface to allow snooping and exchange of data between multiple internal private caches and a shared cache. Some embodiments implement a caching protocol having two different modified states. These and other embodiments may be used in a chip multiprocessor having multiple processor cores and associated private caches, along with a shared cache. Some embodiments provide fast resolution of data inconsistency, reduce latency of data fetched from the shared cache to a core, and/or reduce memory access latency in private cache to private cache transfer scenarios.

Figure 1:
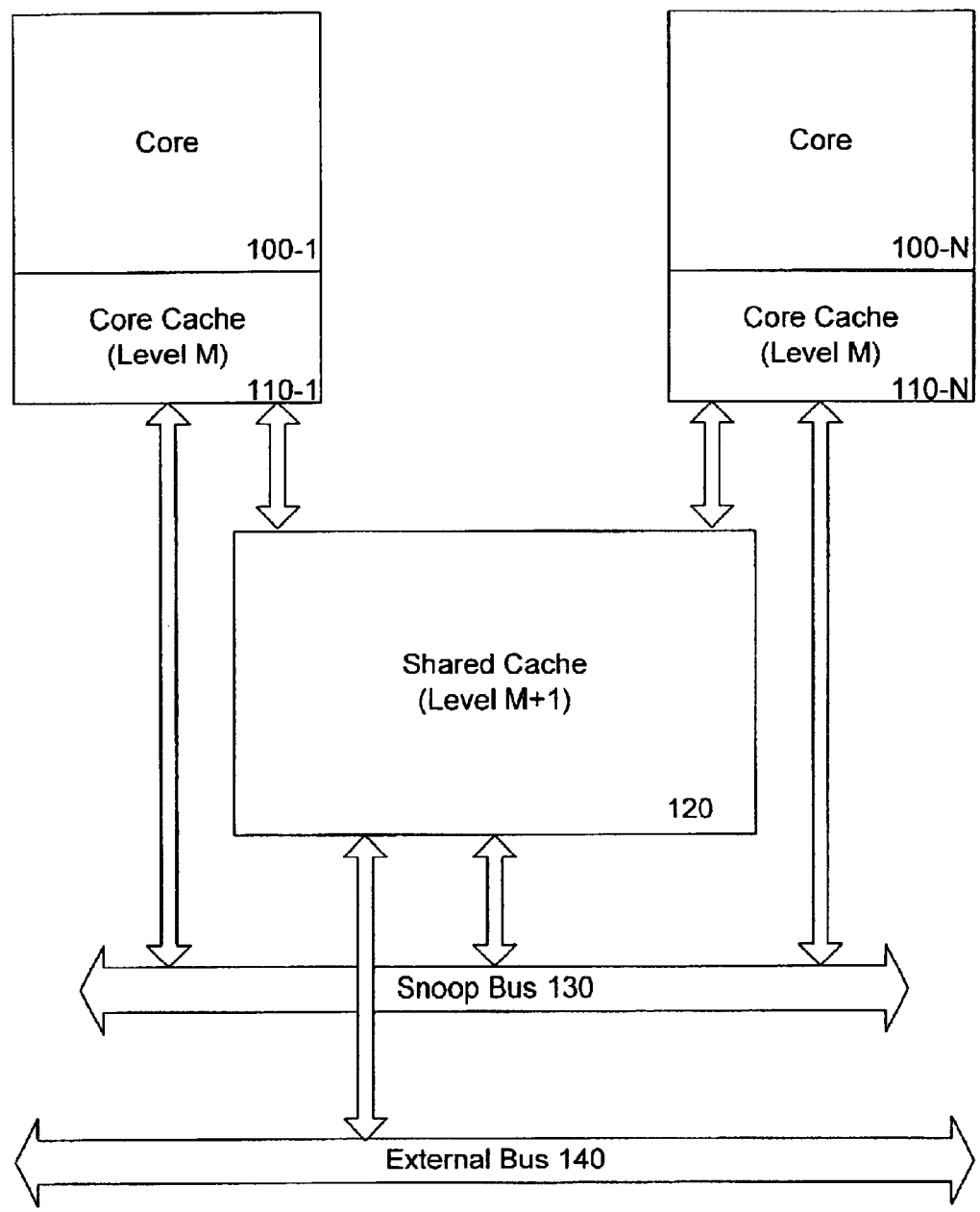
FIG. 1 illustrates one embodiment of a processing system including a snoop bus coupling core caches to each other and to a shared cache.

FIG. 1 illustrates one embodiment of a processing system including a snoop bus 130. In some embodiments, the processing system of FIG. 1 may be a chip multiprocessor. A chip multiprocessor is a single integrated circuit or a single module which contains multiple processing cores. Each processing core is a processor capable of executing instructions. The embodiment of FIG. 1 includes N processing cores, core 100-1 through 100-N. Each processing core 100-1 through 100-N includes a private cache associated therewith and coupled thereto, respectively core cache 110-1 through 110-N.

A "private" cache is a cache that is associated with one or more processor core(s) in that the processor core(s) normally presents memory transactions to cacheable memory to the private cache, and not just under the circumstance of a snoop or inquiry cycle, whereas other non-associated processors or processor cores typically present cycles to the private cache as inquiry or snoop cycles. Often, a single private cache may be associated with a single core as is the case in the embodiment of FIG. 1. However, in some embodiments, a cache may be private to a number of cores.

As illustrated in FIG. 1, the core caches may be an M level caches, meaning that these caches need not be a first level cache, but rather can be either a first level cache or a cache at a higher level in the cache hierarchy, such as a second level cache, a third level cache, etc. Additionally, the core caches may be unified instruction and data caches, or may be one or the other. Moreover, two separate caches (e.g., instruction and data caches) could be treated similarly. Accordingly, the terms data, data element, information, or information element may be used interchangeably to refer to either instructions or data.

Each of the caches 110-1 through 110-N are coupled to the snoop bus 130. Additionally, a shared cache 120 (a level M+1 cache) is coupled to the snoop bus 130. The shared cache 120 is also coupled to an interconnect 140. The interconnect 140 may be a multidrop bus or may be a point-to-point interface to connect with another processor, memory, memory interface, or other agent. Likewise, point-to-point interconnects or a multidrop bus type interconnect may be used for the snoop bus 130 in various embodiments.

In one embodiment, the caches 110-1 through 110-N and the shared cache 120 perform cross interrogations or snoops to maintain data coherency over the snoop bus 130. Such a dedicated bus or interface for snoops may alleviate congestion on the interconnect 140. In one embodiment, the snoop bus 130 is an on-die bus in a chip multiprocessor. Therefore, cross interrogation may be performed at a high frequency, in some cases as high as an operating frequency of a core. Additionally, external accesses may be limited to requests that cannot be satisfied between the multiple cores on the die and the shared cache. In one embodiment, the caches may use a traditional MESI (Modified, Exclusive, Shared, Invalid) protocol or another known or otherwise available protocol. In other embodiments, as will be further discussed below, a different multi-state protocol may be used for the shared cache.

Figure 2:
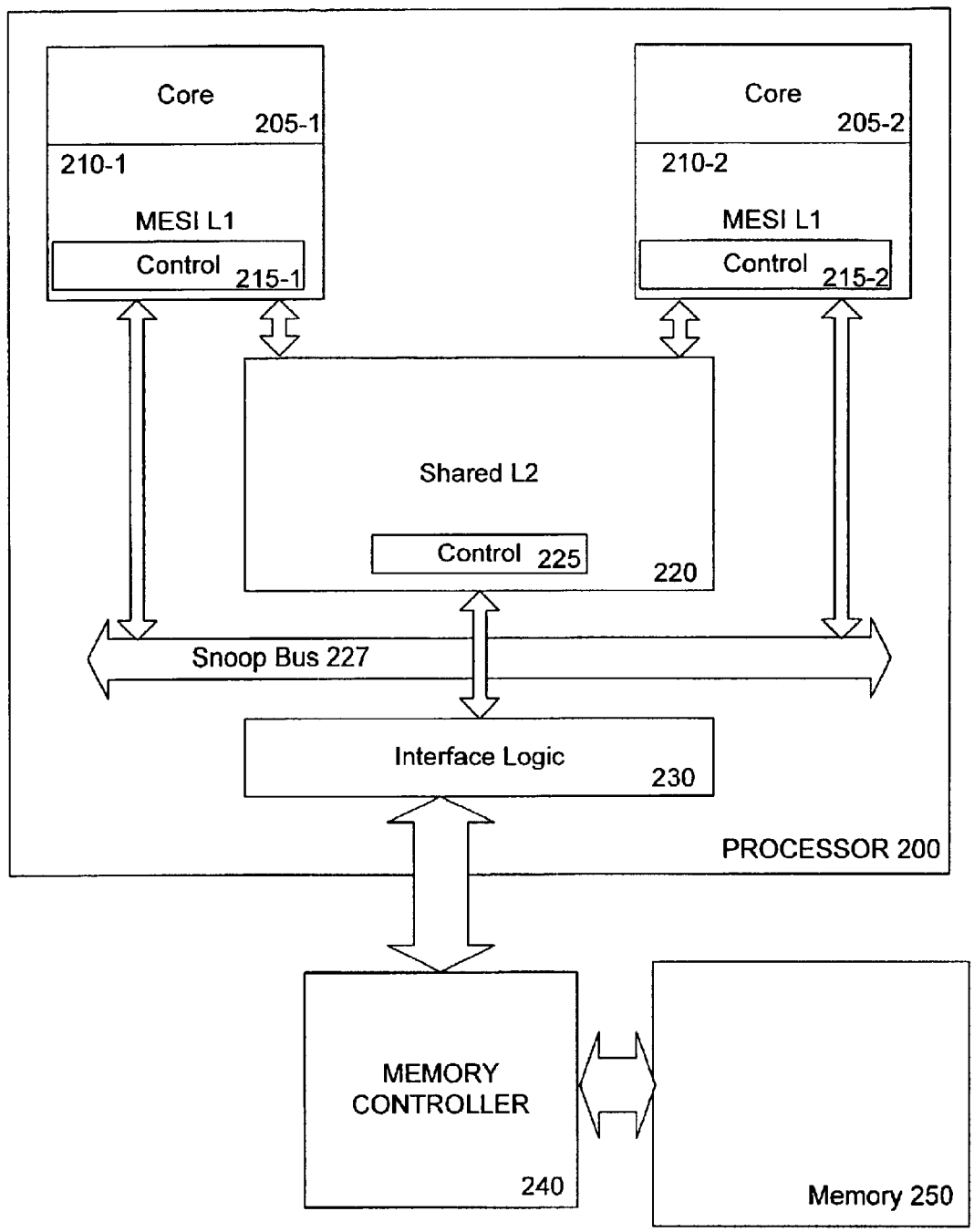
FIG. 2 illustrates one embodiment of a system including a chip multiprocessor having a snoop bus and implementing a shared cache coherency protocol.

FIG. 2 illustrates one embodiment of a system including a chip multiprocessor having a snoop bus and implementing a shared cache coherency protocol. In the embodiment of FIG. 2, a processor 200 is coupled by interface logic 230 to a memory controller 240. The memory controller 240 is coupled to a memory 250. The memory 250 is capable of storing data to be used by the processor 200 and to be cached in its various caches.

The processor 200 includes interface logic 230 to communicate information to the memory controller 240 (or some other bus agent). A variety of known or otherwise available types of interface logic and interconnects may be used to couple the various components together. The processor 200 further includes a first core 205-1 and a second core 205-2. The first core has an associated core cache 210-1, and the second core has an associated core cache 210-2. In this embodiment, the core caches operate according to the MESI protocol, although in other embodiments, other protocols may be used. The core caches 210-1 and 210-2 have respectively control logic 215-1 and 215-2 in order to maintain coherency and handle traditional cache control and communication tasks. The caches 210-1 and 210-2 are both coupled to a shared cache 220, which also includes its own control logic 225. The caches 210-1, 210-2 and 220 are all coupled to a snoop bus 227 to perform cross interrogation and data exchange as previously described with respect to FIG. 1.

In this embodiment, the shared cache 220 operates according to a shared cache protocol. According to the shared cache protocol, two modified states may be used to describe cache lines. A modified stale (MStale) state may be used to represent the case when the shared cache 220 has a stale copy of a cache line. The shared cache would have a stale copy of a modified line when one of the processor caches 210-1 or 210-2 modifies the cache line. A modified most recent copy (MMRC) state may be used to represent the case when the shared cache contains the most recent copy of a modified line. A shared state may be used to indicate when multiple caches have the data, but it is not modified in any of them, and an invalid state just indicates that the data is not valid. Therefore, as compared to the traditional MESI protocol, the exclusive (E) state has been eliminated in this embodiment, and the M state has been split into two different M states.

TABLE 1

Shared Cache Protocol States

| State | Abbreviation | Meaning |
| --- | --- | --- |
| Modified Stale | MStale | The cache line has been modified and the shared cache has a stale copy of the line. Some other L1 cache has a more recent copy. |
| Modified Most Recent Copy | MMRC | The cache line has been modified and the shared cache has the most recent copy, the copy that reflects the modification. |
| Shared | S | The cache line may be stored in multiple caches but is not modified in any of them. Also implies that memory is up to date. |
| Invalid | I | The cache line does not contain valid data. |

It is to be understood that cache lines may be maintained or tagged as being of a particular state in a variety of manners. For example, tag bits may be used to represent the various states. Such tag or state bits may be stored in conjunction with each cache line. The state bits may also be stored separately in a separate memory array. Moreover, the protocol state bits may be combined with other information about the cache line and stored in an encoded or other form. The ultimate treatment of a cache line may also be influenced by other bits or settings, such as memory typing registers, or the like.

Figure 3A:
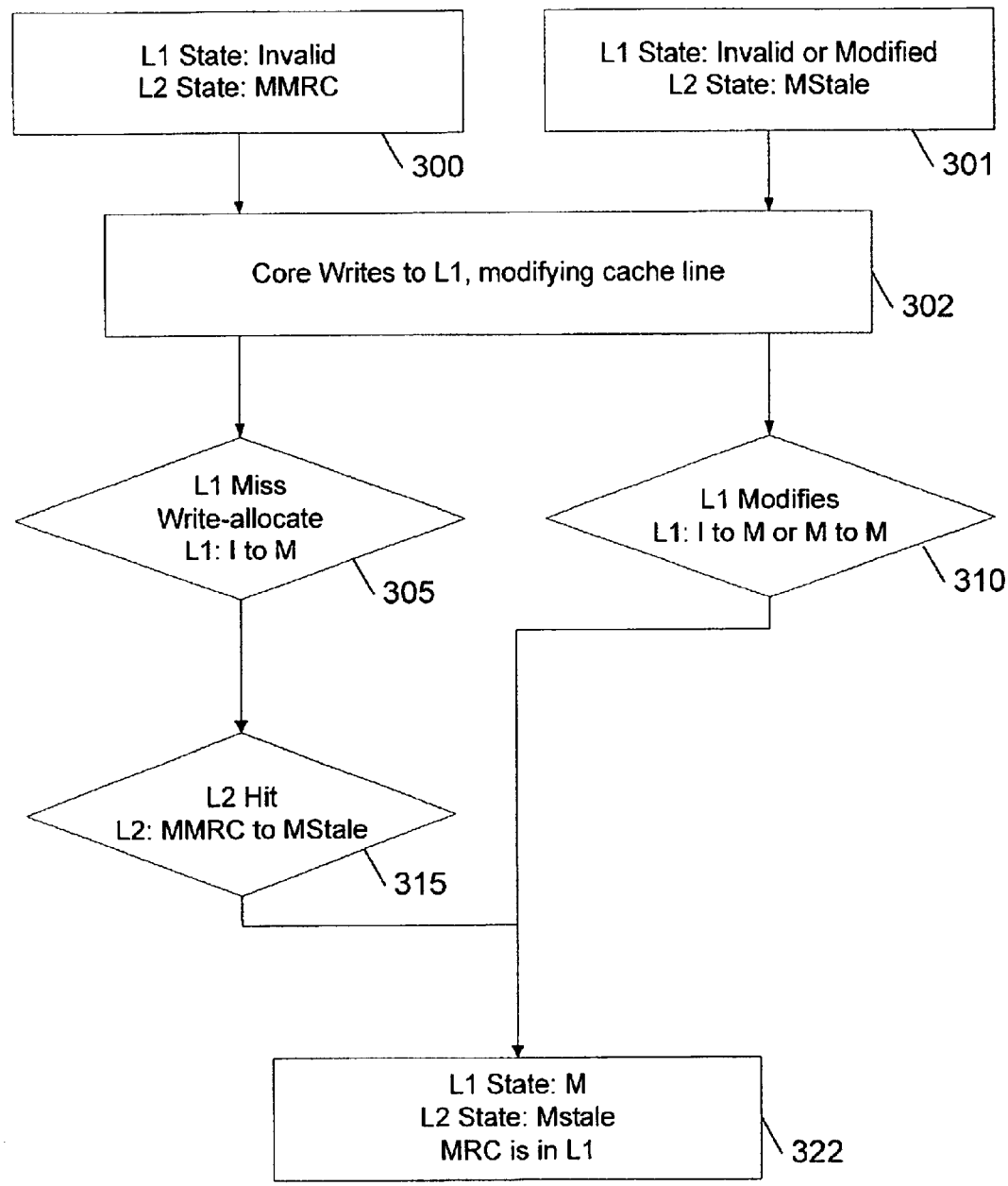
FIG. 3a–3f illustrate various state transitions for shared and private caches according to one embodiment.

FIG. 3a illustrates a first set of state transitions under a first set of conditions for shared and private caches according to one embodiment. In the situation described in FIG. 3a, in one case, a cache line in the L1 cache begins in an invalid state, and the cache line corresponding to the same memory location in the L2 cache begins the modified most recent copy state, as indicated in block 300. In the second case, a cache line in the L1 begins in an invalid or modified state and the cache line corresponding to the same memory location in the L2 begins in the modified stale state as shown in block 301. The core writes to a cache line as indicated in block 302 in both cases.

A miss occurs in the L1 in the first case, as indicated in block 305, and in one embodiment a write allocate policy is used such that the L1 obtains the cache line (from the L2) and maintains the cache line in the modified state. Since the cache line was stored in the modified most recent copy state in the L2 in this case, an L2 hit occurs and the state of the line in the L2 is changed to modified stale. For example, a read for ownership cycle to the L2 may provide the data to the L1 and trigger a transition from modified most recent copy to modified stale in the L2. As indicated in block 322, this situation leads to the L1 cache having its cache line in the modified state, and the L2 having its cache line in the modified stale state because the L1 has the most recently modified data. According to the writeback protocol adhered to by the L1, the L1 may not propagate the modified data to the L2 or the rest of the memory hierarchy until it is evicted or a snoop hits that cache line.

In the second case, the core writing to the L1 in block 302 results in the L1 modifying the data as indicated in block 310, and the L2 maintains the cache line in the modified stale state. If the cache line in the L1 was in the invalid state, it transitions to the modified state, and if the cache line in the L1 was in the modified state, it remains in the modified state as indicated in block 310. In some embodiments, the L2 may not be informed that a write to the cache line occurred in the L1 and therefore the L2 simply does nothing, resulting in the cache line remaining in the modified stale state. Thus, the resulting cache line states for the L1 and L2 are respectively modified and modified stale as indicated in block 322.

Figure 3B:
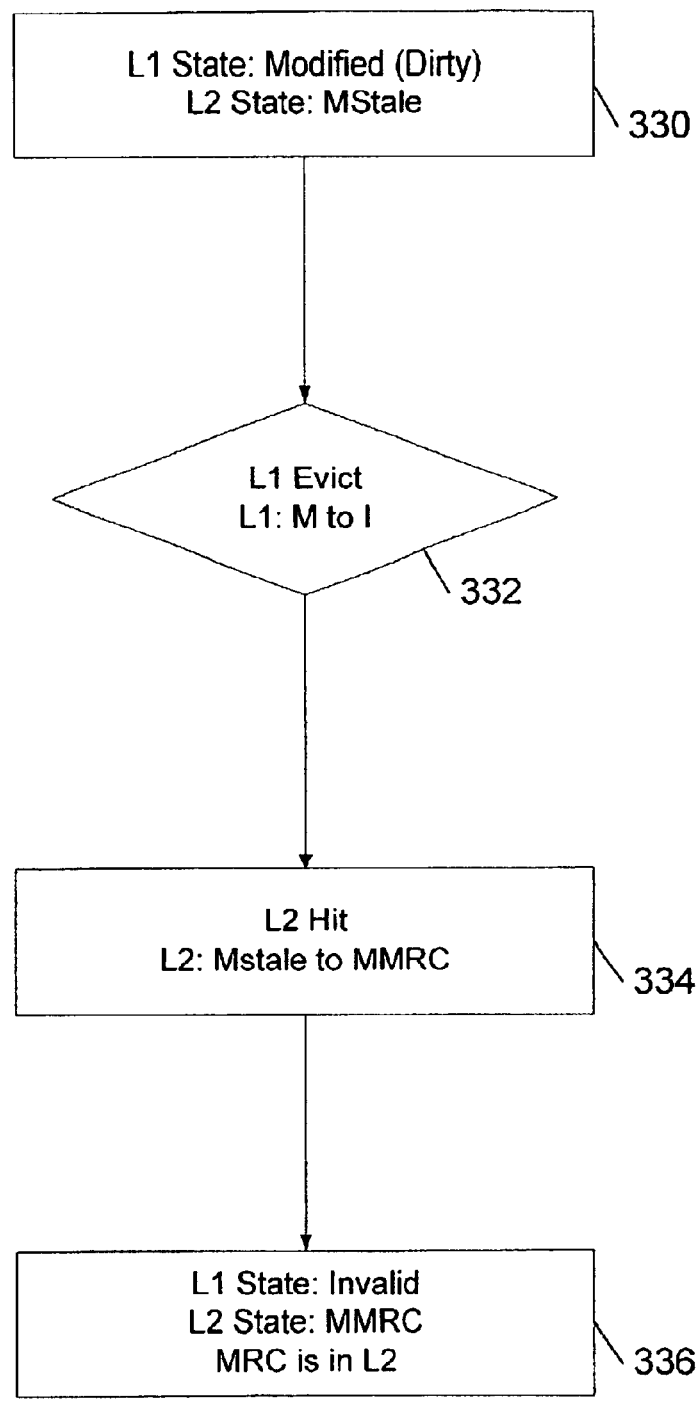

FIG. 3b illustrates a second set of state transitions under a second set of conditions according to one embodiment. As indicated in block 330, a cache line in the L1 cache begins in a modified (dirty) state, and the cache line corresponding to the same memory location in the L2 cache begins in the modified stale state. Upon an L1 eviction (block 332), an L2 hit (block 334) will occur in this embodiment, and the final cache states will be as indicated in block 336. In particular, this situation results from an L1 cache line eviction, and the L2 obtaining the most recent copy from the L1. Thus, the cache line in the L1 is set to the invalid state and the line in the L2 transitions to the modified most recent copy state.

Figure 3C:
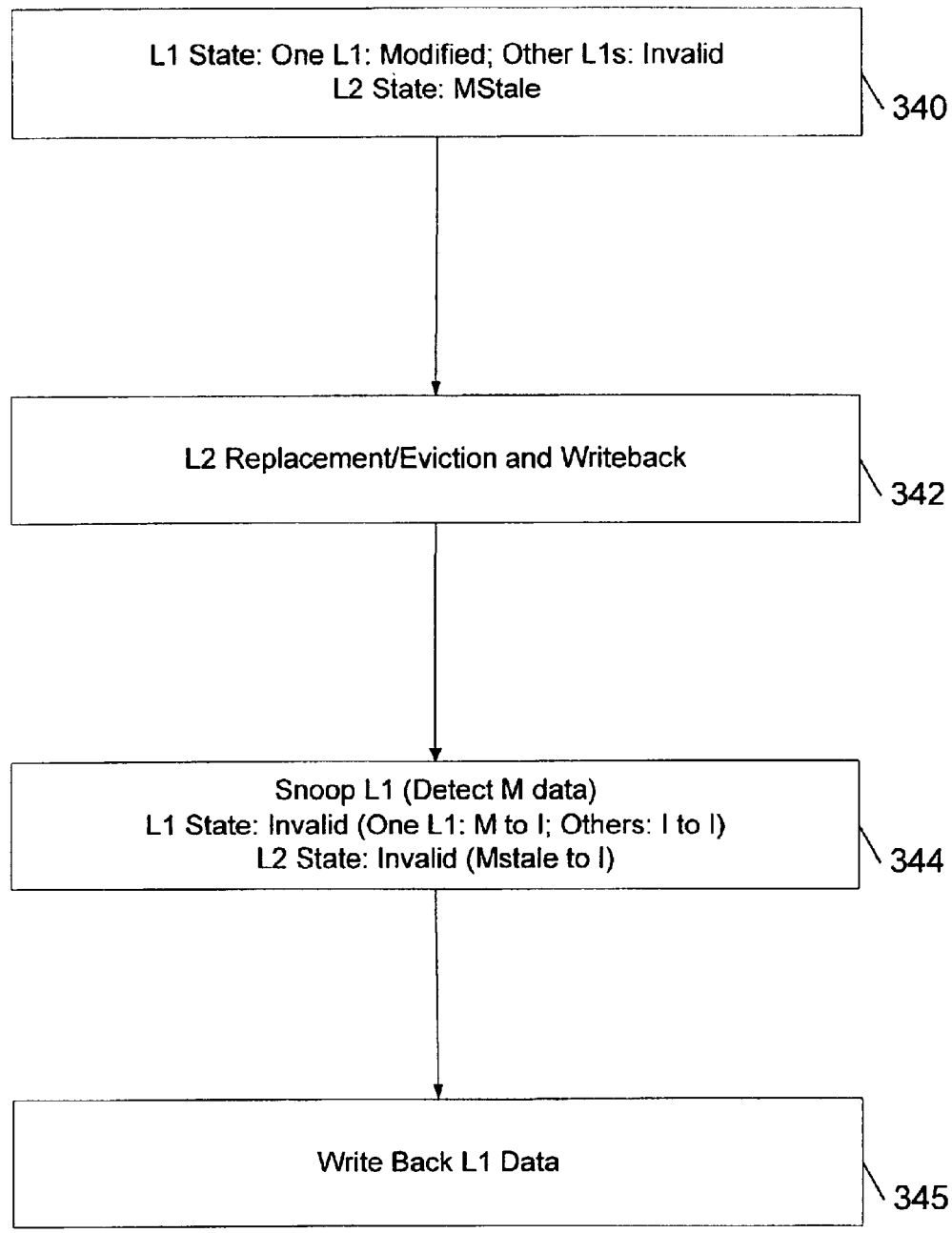

FIG. 3c illustrates a third set of state transitions under a third set of conditions according to one embodiment. As indicated in block 340, a cache line in one of the L1 caches begins in a modified state and in the invalid state in all other L1 caches, and the cache line corresponding to the same memory location in the L2 cache begins in the modified stale state. Next, an L2 replacement occurs as indicated in block 342. The L2 replacement results in the eviction of data from the L2 and a writeback of that data to the memory 250. As a result of this writeback, the L2 cache entry is invalidated. Of course if the entry was being evicted to make room for a new line, that new line may later become valid. Since, as indicated in block 340, the L2 data was in the modified stale state, it follows that one of the L1 caches contains the cache line in the modified state under the L1 MESI protocol. Therefore, as indicated in block 344 a snoop of the L1 caches is performed to extract the modified data, and to invalidate the cache line if it is present in any L1 cache. The cache line is invalidated in the L1 that had the cache line in the modified state. Thus, the state of the cache line in both L1 and L2 caches becomes invalid as indicated in block 344, and data received from the snoop of the L1 caches may be written back as indicated in block 345.

Figure 3D:
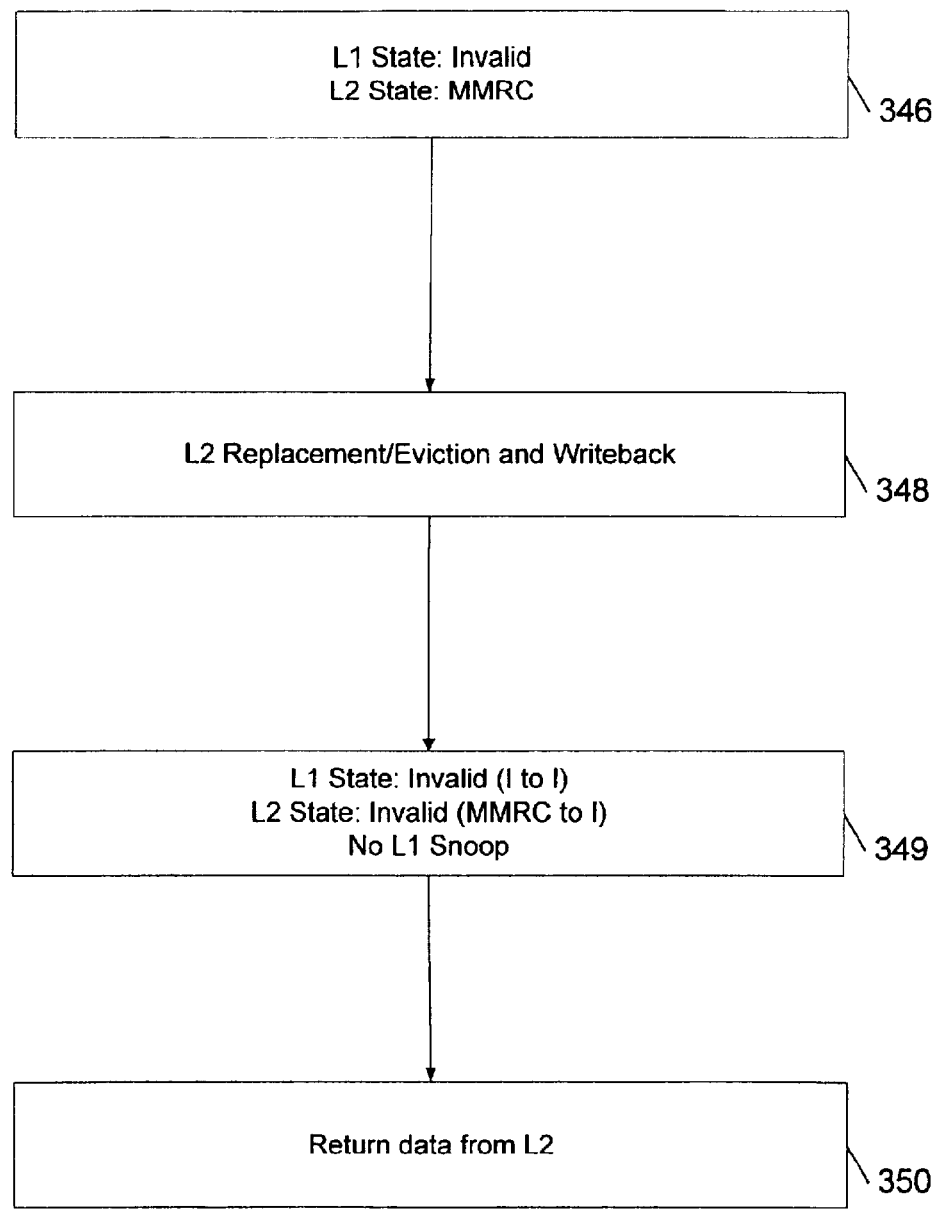

FIG. 3d illustrates a situation similar to that of FIG. 3c, except that the state of the cache line in the L2 cache is originally modified most recent copy as indicated in block 346 (the state in the L1 cache(s) is invalid since the L2 has the most recent copy). An L2 replacement occurs as indicated in block 348, as discussed with respect to block 342 in FIG. 3c. As a result of the L2 replacement in block 348, once again, as indicated in block 349, the state of the cache line in both L1 and L2 caches becomes invalid. However, in this case, since the state of the line in the L2 cache was originally modified most recent copy, then the L2 contained the most recent copy, and no inquiry to the L1 caches is necessary. Accordingly, no snoop to the L1 caches is performed as indicated in block 349, and data from the L2 is written back to memory as indicated in block 350.

In the case of FIG. 3c, a snoop was performed due to the presence of a modified line in one of the L1 caches. In the case shown in FIG. 3d, the snoop to the L1 cache was not performed because the shared L2 cache contained the most recent copy of the data. In some embodiments, under the circumstances of FIG. 3d (i.e., L1 state invalid, L2 state modified most recent copy), it may be desirable to run invalidating cycles to the L1 caches associated with processors other than the requesting processor. For example, if the processor cores are capable of performing speculative loads and maintain load buffers, then data may be held in a load buffer in modified form. Additionally, this data may be data that was evicted from the L1 cache. Next, if a different processor tries to write to the cache line, it experiences a miss (line is invalid in L1s, L2 state is modified most recent copy), and attempts to gain ownership of the cache line to perform the requested write. Despite the fact that the L2 cache contained the data in the modified most recent state, it may not be able to ensure that the data is not also present in a speculative load buffer or another buffering structure. Therefore, in some embodiments, it may be advantageous to generate an invalidating snoop cycle to other L1 caches.

Figure 3E:
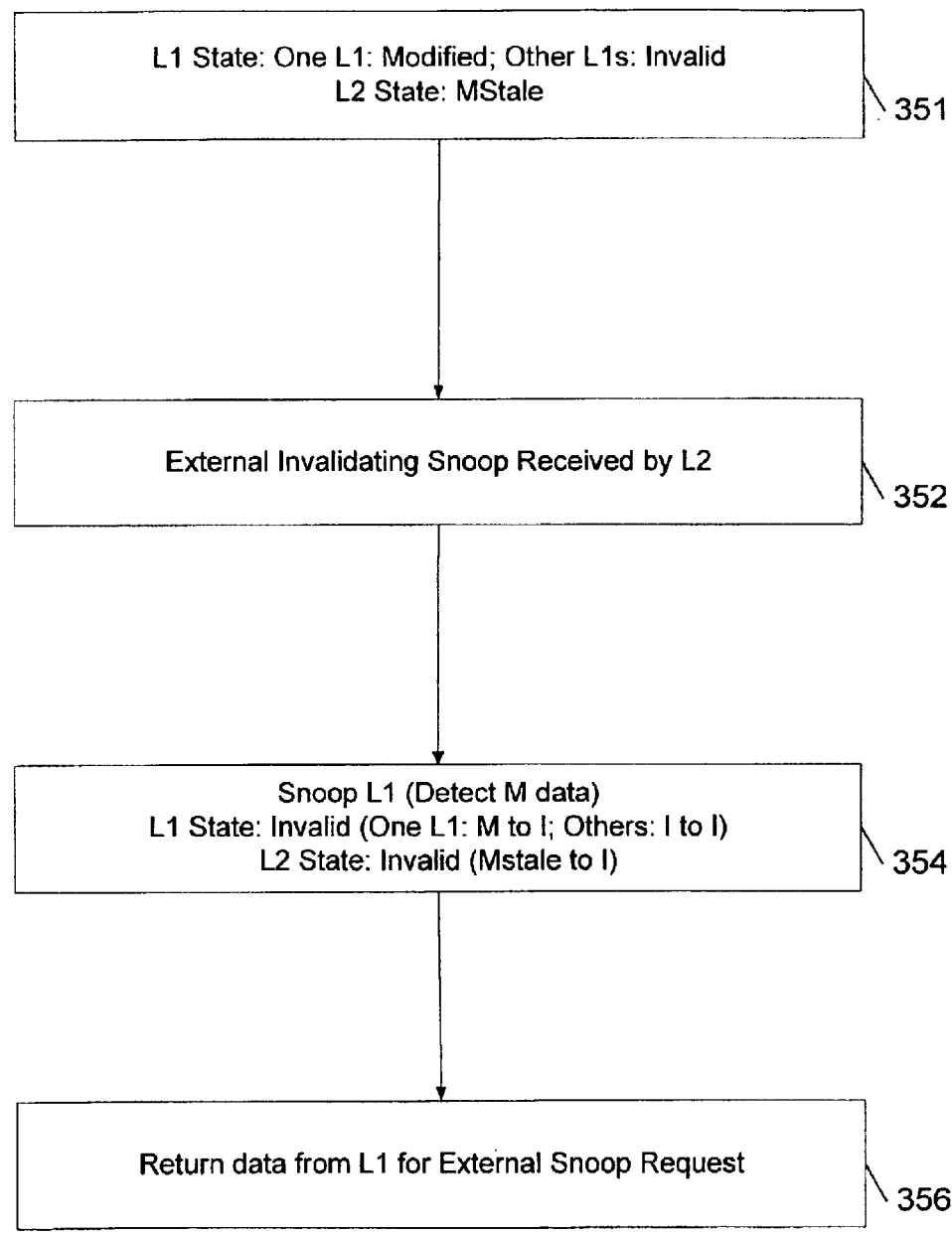

FIG. 3e illustrates the handling of an external invalidating snoop in a case where the L2 contains the implicated cache line in the modified stale state according to one embodiment. Other snoops may be treated similarly in some embodiments, and the invalidating snoop example is given as representative of a broad class of state-changing snoop operations. The external invalidating snoop may be received from the interface logic 240 and may have originated from another bus agent (not shown) such as another processor, an input/output (I/O) agent, a direct memory access agent, etc. The external invalidating snoop indicates an address, and the implicated line for that snoop is the line which corresponds to the address. As indicated in block 351, in the L1 cache, the cache line state is modified in one L1 cache and invalid in the other L1 caches, and the L2 cache line state is modified stale. The external invalidating snoop is received by the L2 in block 352. As a result of the external invalidating snoop, the state of the cache line in the L1 and L2 caches is set to invalid as indicated in block 354. Since the L2 only contains stale data, one of the L1 caches contains modified data according to its MESI protocol. Therefore, a snoop cycle to the L1 caches is performed as also indicated in block 354. Modified data is supplied by one of the L1 caches to satisfy the external snoop as indicated in block 356.

For other types of snoop operations, the state of the cache line(s) may be set to other states as a result of the snoop. For example, a snoop operation may instruct a cache to alter the state of a cache line to the shared (S) state, effectively issuing a command to the cache to maintain data in that line in the shared state. In response to a snoop which forces a transition to the shared state, such a transition to the shared state occurs instead of the transitions to the invalid state indicated in block 354.

Additionally, another embodiment may implement a centralized cache directory to reduce the need to snoop individual L1 caches. For example, a cache directory for the shared cache may also track the state of cache lines in all other L1 caches. In another embodiment, a cache directory may be maintained for the various L1 caches. The use of such a cache directory would eliminate the need to send individual snoop cycles to all the L1 caches. Instead, the cache directory would indicate which L1 caches should receive the invalidation snoops.

Figure 3F:
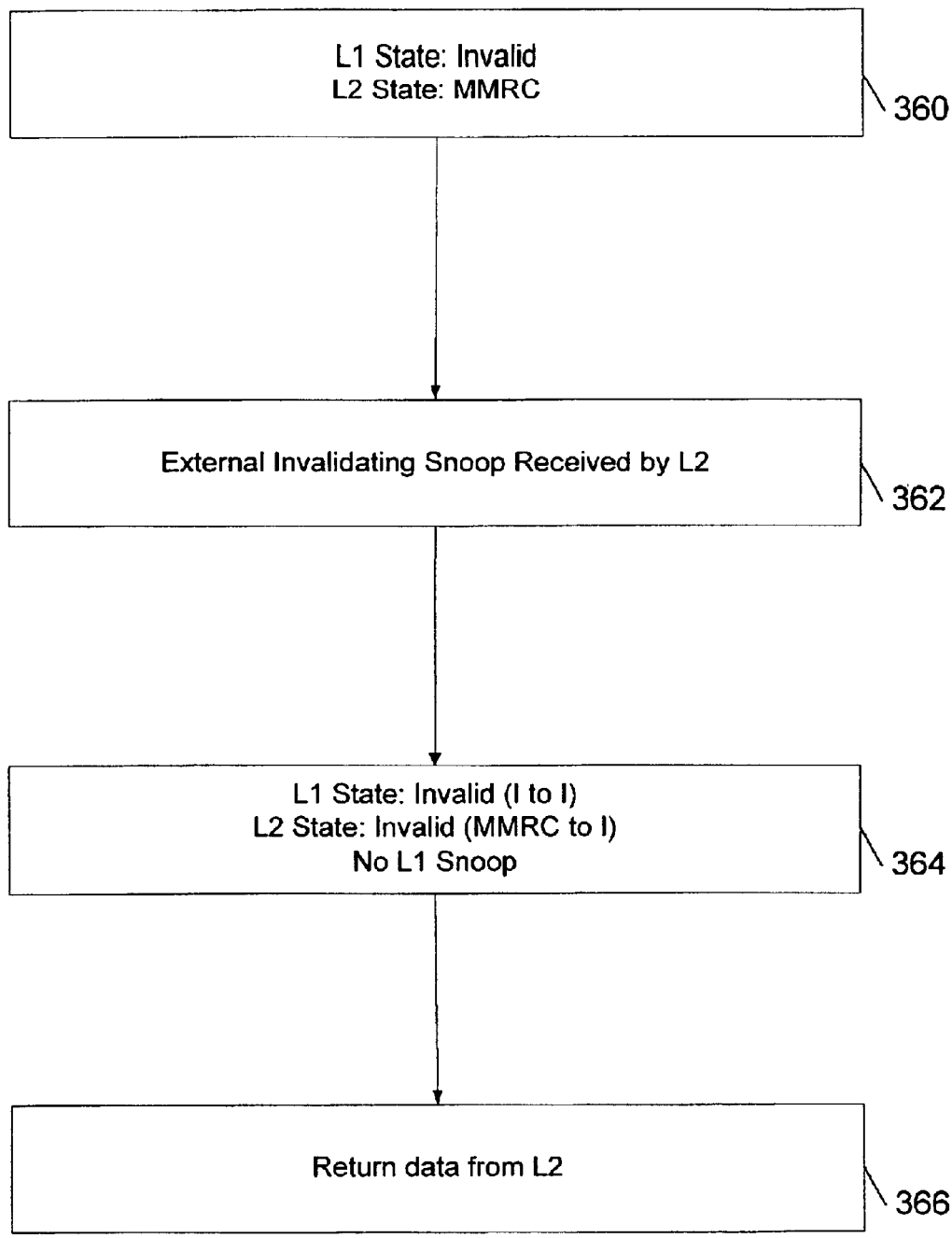

FIG. 3f illustrates the handling of an external invalidating snoop in a case similar to that of FIG. 3e except that the L2 contains the implicated cache line in the modified most recent copy state. As indicated in block 360, in the L1 cache, the cache line state is invalid, and the cache line state is modified most recent copy. The external invalidating snoop is received by the L2 in block 362. As a result of the external invalidating snoop, the state of the cache line in the L1 and L2 caches is set to invalid as indicated in block 364. Since the L2 contains the most recent data, the external snoop is satisfied by returning the most recent and modified data from the L2 cache in response to the internal invalidating snoop request as indicated in block 366. Therefore, a snoop cycle to the L1 caches is not needed prior to returning data to satisfy the external snoop cycle. Again, other types of snoop (other than invalidating snoops) may be handled similarly as discussed above.

TABLE 2

Summary of M-States

| | | Initial State | | Final State | | Meaning/ |
|---|---|---|---|---|---|---|
| Figure | Write Event | L1 | L2 | L1 | L2 | Action |
| 3a | L1 Hit, or L1 I to M transition and L2 hit | I or M | MMRC or MStale | M | MStale | MRC in L1 |
| 3b | L1 replacement and L2 hit | M | MStale | I | MMRC | MRC IN L2 |
| 3c | L2 replacement and writeback | I or M | MStale | I | I | One of the L1s has MRC. Logic performs back-inquiry to all L1s |
| 3d | L2 replacement and writeback | I | MMRC | I | I | No one L1 has MMRC. No need for back-inquiry |
| 3e | Ext. Invalidating Snoop | I or M | MStale | I | I | One of L1s has MRC. Logic sends snoop to all L1s (or directory) |
| 3f | Ext. Invalidating Snoop | I | MMRC | I | I | L2 has MRC; No need to snoop L1s |

Figure 4:
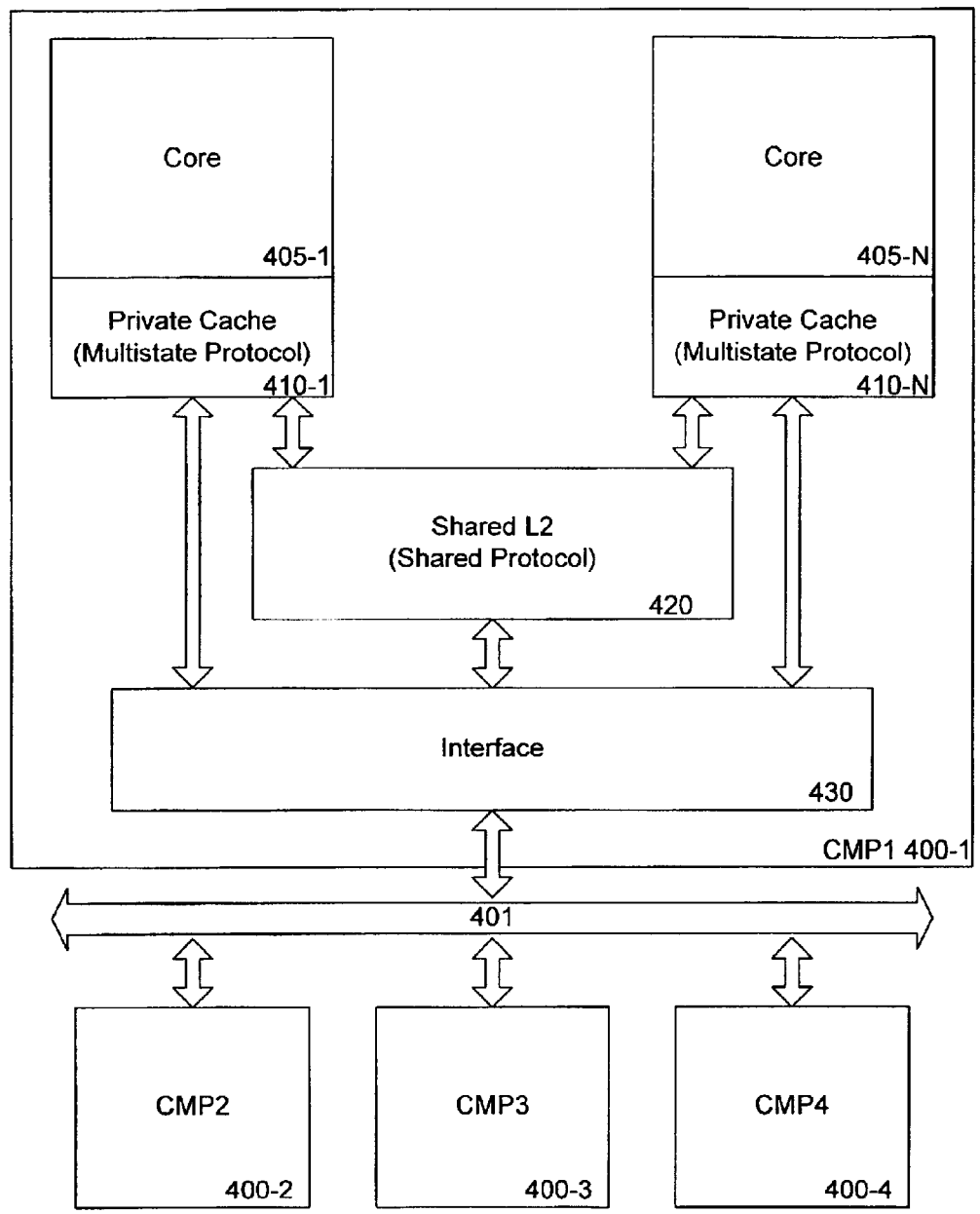
FIG. 4 illustrates another embodiment of a system including a chip multiprocessor implementing a plurality of private caches with multi-state protocols and a shared cache with a multi-state shared cache protocol.

FIG. 4 illustrates another embodiment of a system including a chip multiprocessor implementing a plurality of private caches with multi-state protocols and a shared cache with a multi-state shared cache protocol. The embodiment of FIG. 4 illustrates that the processor 400-1 may not include an internal snoop bus in some embodiments. Moreover, the embodiment of FIG. 4 also illustrates that a number of chip multiprocessors 400-1 through 400-4 may be coupled together to form a multiple chip multiprocessor system. The four processors 400-1 through 400-4 may be the same in one embodiment. The four processors 400-1 through 400-4 are shown as being coupled by a multidrop bus 401; however, point-to-point or other interconnect technologies may also be used. Furthermore, additional components such as memories and I/O devices are typically present in a system.

The processor 400-1 includes interface logic 430 to communicate via the interconnect provided (in the illustrated embodiment, the multidrop bus 401). The processor 400-1 includes N cores 405-1 through 405-N, which each have their own private caches, respectively 410-1 through 410-N, which are coupled to the interface logic 430. A shared higher level cache 420 is also provided and coupled to the interface logic 430. The various caches may maintain cache protocols as previously described. In this embodiment, the interface logic and the interconnect between processors participates in coherency checking more than in embodiments with an internal snoop bus. In this embodiment, all snoop cycles between caches are handled through the interface logic 430 and reflected to the multidrop bus 401 or other appropriate (e.g., point-to-point) interconnect.

Figure 5:
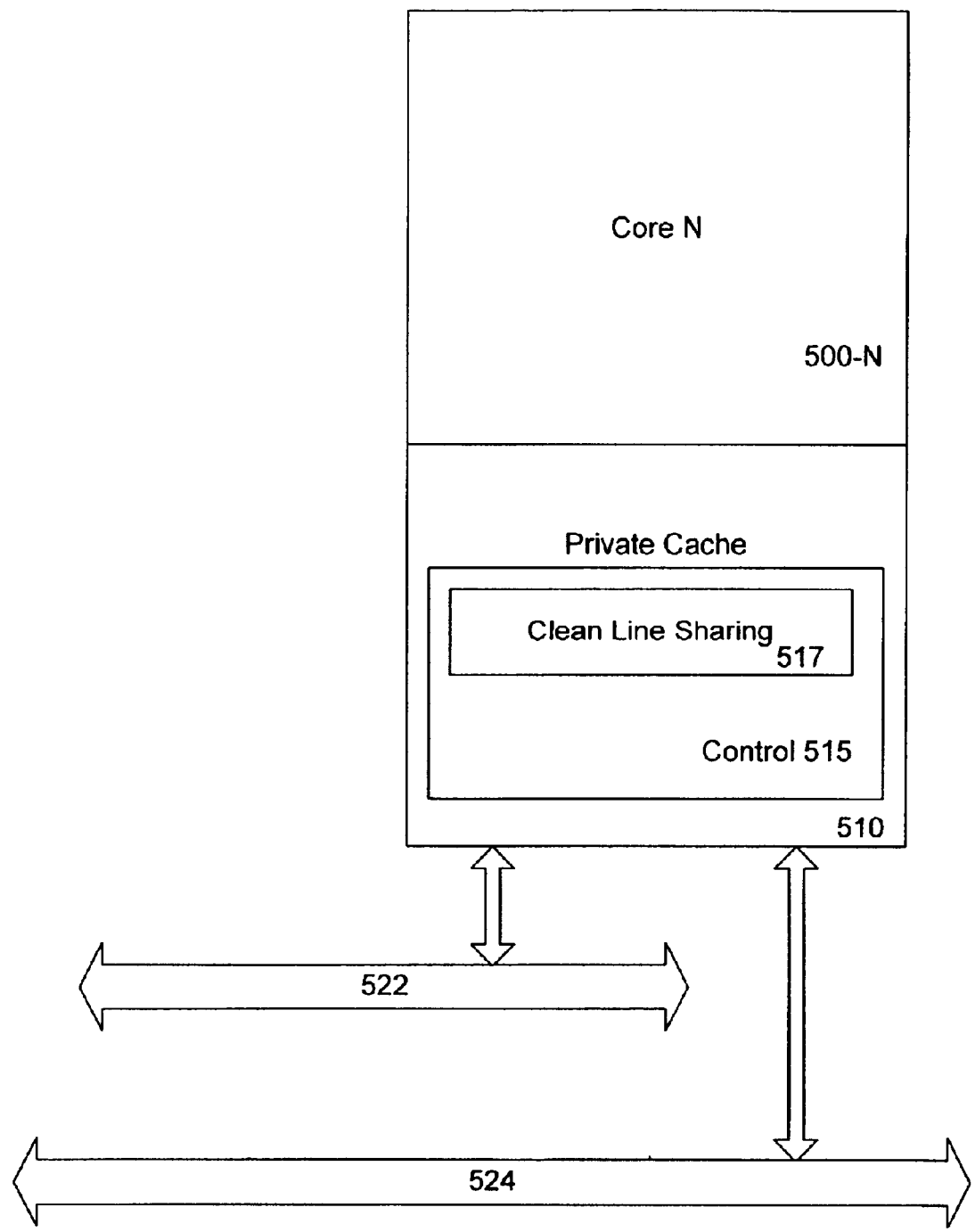
FIG. 5 illustrates one embodiment including clean line sharing logic.

FIG. 5 illustrates one additional feature used in some embodiments. In the embodiment of FIG. 5, a core 500-N of a chip multiprocessor may include clean line sharing logic 517. As illustrated, the core 500-N may include a cache 510 (e.g., a MESI protocol cache as discussed previously). The cache 510 includes control logic 515, a part of which is the clean line sharing logic 517. The cache 510 may be coupled to other caches and a shared higher level cache by a snoop interconnect 522. Additionally, the cache may be coupled to an external interface by a second interconnect 524.

The clean line sharing logic 517 may provide a performance boost by spreading correct information to other caches. The presence of an internal snoop interconnect 522 that may be dedicated to handle snoop traffic and data exchange provides added bandwidth for such cache-to-cache transfers that might unacceptably consume bandwidth of a system that uses a single bus or interconnect for both snoop purposes and to retrieve data from higher levels in the memory hierarchy. The clean line sharing logic 517 causes the control logic 515 to write cache lines from an L1 cache back to the other caches in circumstances other than just eviction. That is, the clean line sharing logic 517 is to provide cache lines to other caches that are subsequently at least temporarily maintained within the sharing cache (not just evicted lines).

In one embodiment, the clean line sharing logic 417 provides data to satisfy snoop cycles on the snoop interconnect 522. That is, if a cache detects a snoop cycle for which it can provide valid data, then that cache supplies that data in response to the snoop cycle (as opposed to waiting for a higher level in the memory hierarchy to provide that data). In another embodiment, the L1 cache is simply operated as a write-through cache. In another embodiment, the clean line sharing logic 517 writes back data opportunistically to other caches as bandwidth permits. In yet another embodiment, the clean line sharing logic may be configurable to write back lines to various combinations of the other caches and/or memory under a variety of conditions and/or in response to snoop bus congestion. In one embodiment, each private cache includes the clean line sharing logic 517.

The proactive transfer of data between the cores may be advantageous to reduce memory access latency and bandwidth consumption in some cases. For example, it would be possible for one core to attempt to access its private cache and the shared L2 cache and miss in both cases, despite the fact that a different core contains the needed data. It is desirable to transfer data between the cores to avoid having to provide the data by generating a cycle to the external interface or by accessing the L2 cache.

Various traditional read and write policies may be used in various embodiments. For example, an allocate on write policy may be used in some cases to bring a cache line into the cache when a write to the line occurs. Additionally, a read from a lower level cache may or may not cause a higher level cache to be filled (i.e., the higher level caches may or may not be inclusive in some embodiments).

Moreover, a design may go through various stages, from creation to simulation to fabrication. Data representing a design may represent the design in a number of manners.

First, as is useful in simulations, the hardware may be represented using a hardware description language or another functional description language Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. An optical or electrical wave modulated or otherwise generated to transmit such information, a memory, or a magnetic or optical storage such as a disc may be the machine readable medium. Any of these mediums may "carry" the design information.

Thus, techniques for method and apparatus for shared cache coherency for a chip multiprocessor or multiprocessor system are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
    a plurality of processor cores, each processor core comprising a private cache implementing a multi-state protocol;
    a shared cache implementing a second multi-state protocol including a plurality of states comprising a first modified state in which the shared cache has a stale copy of a cache line that is modified in the private cache of one of the plurality of processor cores and a second modified state in which the shared cache has a most recent copy of a modified cache line.

2. The apparatus of claim 1 further comprising an internal snoop bus coupled to each private cache and the shared cache to communicate data from each private cache to other private caches and the shared cache.

3. The apparatus of claim 1 wherein said multi-state protocol is a MESI prorocol and wherein said shared cache multi-state protocol is a multi-state having a plurality of states consisting of four states.

4. The apparatus of claim 1 wherein said plurality of states further comprises:
    a shared state in which the shared cache stores a line that is also stored by other caches;
    an invalid state, wherein each cache line in the shared cache is stored in one of the first modified state, the second modified state, the shared state or the invalid state.

5. The apparatus of claim 3 wherein a write to a cache line corresponding to a first address by a first processor of said plurality of processor cores is to set said cache line to a modified state in a first private cache associated with said first processor and is to set a shared cache line corresponding to said first address to the first modified state of said shared cache multi-state cache protocol.

6. The apparatus of claim 3 wherein an eviction of a cache line corresponding to a first address by a first one of said plurality of processor cores is to write back said cache line to said shared cache, to set said cache line to an invalid state, and is to set a shared cache line corresponding to the first address to the second modified state of the shared cache multi-state cache protocol.

7. The apparatus of claim 4 wherein said multi-state cache protocol is a MESI protocol and wherein said plurality of states consists of the first modified state, the second modified state, the shared state, and the invalid state.

8. The apparatus of claim 3 wherein each private cache further comprises:
    clean line sharing logic to opportunistically write back data to other private caches.

9. The apparatus of claim 1 wherein said apparatus comprises machine readable data carried on a machine readable medium.

10. An apparatus comprising:
    a plurality of processor cores;
    a plurality of caches, a first one of said plurality of caches to maintain a plurality of cache lines in one of a plurality of states, said plurality of states comprising:
        a first modified state indicating a most recent copy of a modified line;
        a second modified state indicating a stale copy of the modified line.

11. The apparatus of claim 10 wherein said plurality of states further comprises a shared state and an invalid state, wherein each cache line has an associated cache state entry indicating one of the first modified state, the second modified state, the shared state or the invalid state.

12. The apparatus of claim 10 further comprising:
    a first internal bus coupling the plurality of processor cores;
    an internal coherency bus coupled to each of said plurality of caches and to communicate between said plurality of caches;
    clean line sharing logic to opportunistically write modified data from one cache to other caches via the internal coherency bus.

13. The apparatus of claim 11 wherein other ones of said plurality of caches maintain cache lines according to a second protocol comprising a second plurality of states.

14. The apparatus of claim 13 wherein said other ones of said plurality of caches are a plurality of private level N caches and wherein said first one of said plurality of caches is a shared level N+1 cache.

15. The apparatus of claim 14 wherein said second protocol comprises a MESI protocol.

16. A method comprising:
    maintaining a first four state cache protocol for said shared cache, wherein said first four state cache protocol includes a modified most recent copy state, a modified stale state, a shared state, and an invalid state;
    maintaining a second four state cache protocol for said plurality of internal private caches, wherein said second four state cache protocol includes a modified state, an exclusive state, a shared state, and an invalid state.

17. The method of claim 16 further comprising:
    driving snoop cycles to a plurality of internal private caches and a shared cache on an internal snoop bus;
    driving cache miss cycles to a memory via an external bus.

18. The method of claim 17 further comprising:
    opportunistically sharing write back data among private caches as bandwidth permits.

19. The method of claim 16 further comprising:
transitioning a first cache line to a first modified state in which the first cache line contains a stale copy of a cache line but another cache contains a modified copy of information associated with said first cache line.

20. The method of claim 19 further comprising:
transitioning a second cache line to a second modified state in which the second cache line contains a most recent copy of information associated with said cache line.

21. The method of claim 16 further comprising sharing lines between said plurality of internal private caches.

22. A system comprising:
a multicore processor comprising:
   a plurality of processors;
   a plurality of associated caches;
   a shared cache;
   coherency logic to maintain a plurality of cache lines in one of a plurality of states, said plurality of states comprising a most recent copy modified state and a stale modified state, said coherency logic to maintain a first data item having a corresponding first address in said stale modified state and a second data item having a corresponding second address in said most recent copy modified state;
a memory coupled to the multicore processor, said memory to store a third data item at said first address and a fourth data item at said second address, said memory being optionally updated to copy said first data item to said first address.

23. The system of claim 22 wherein said multicore processor further comprises an internal snoop bus coupling said plurality of caches to allow data transfer between said plurality of caches in response to snoop cycles on the internal snoop bus.

24. The system of claim 22 wherein said system is a server computer system.

25. The system of claim 23 further comprising logic to share lines between said plurality of associated caches in response to snoop cycles on the internal snoop bus.

* * * * *